UNITED STATES PATENT OFFICE.

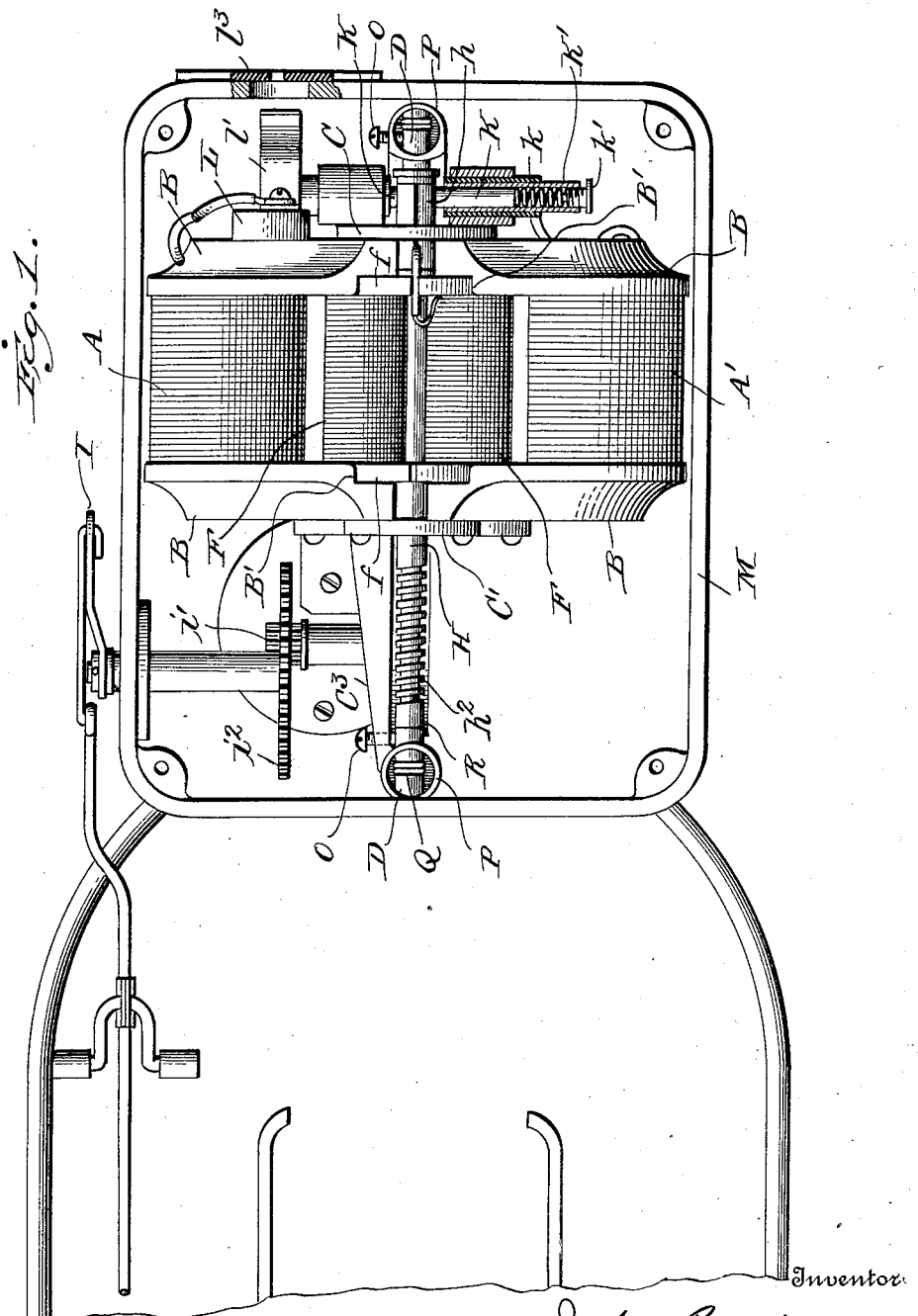

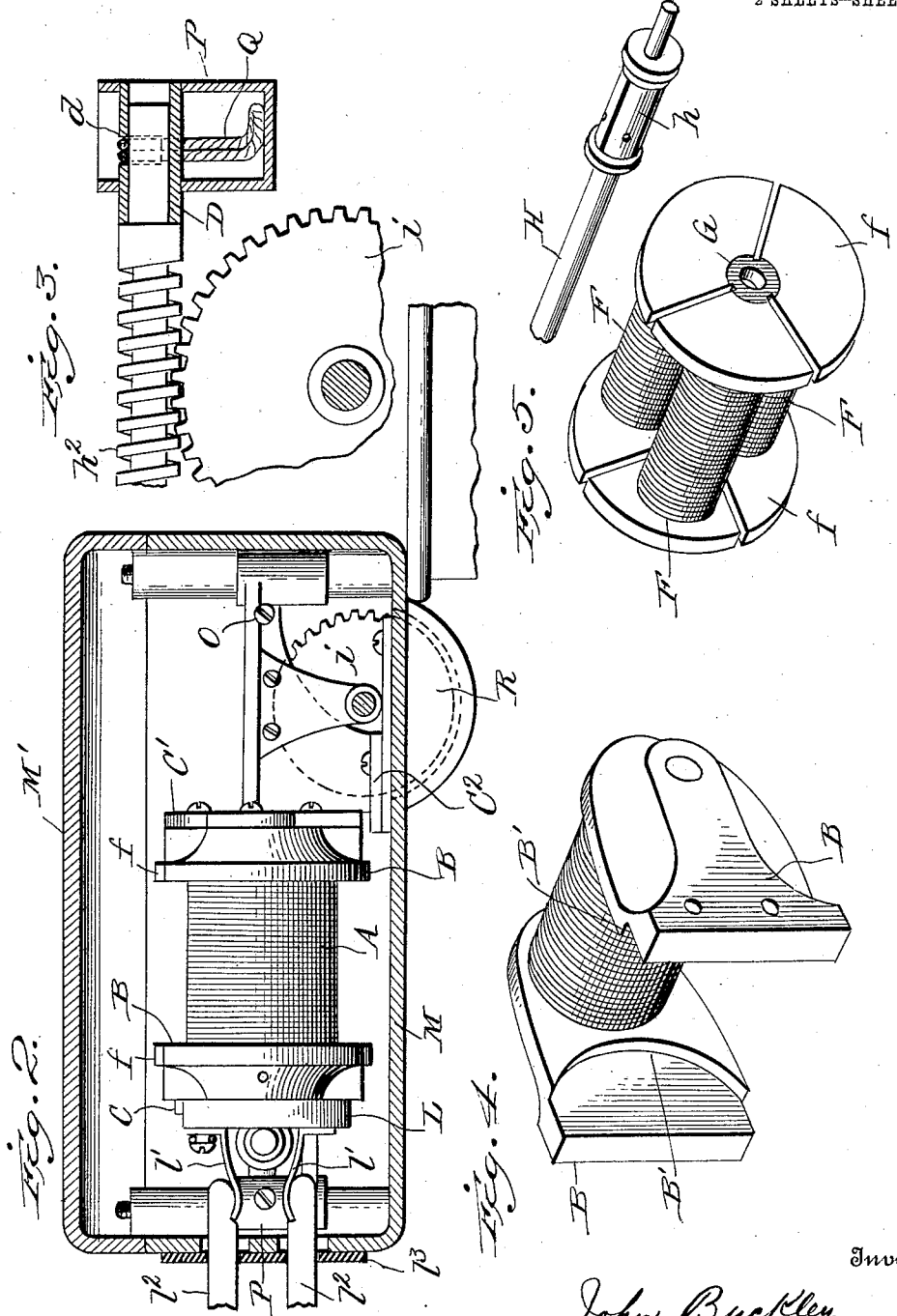

JOHN BUCKLEY, OF BOSTON, MASSACHUSETTS, ASSIGNOR TO ADOLPH SOMMER, TRADING AS THE VISCOL COMPANY, OF CAMBRIDGE, MASSACHUSETTS.

ELECTRIC MOTOR.

1,066,582.  Specification of Letters Patent.  Patented July 8, 1913.

Application filed April 9, 1912. Serial No. 689,656.

*To all whom it may concern:*

Be it known that I, JOHN BUCKLEY, a citizen of the United States, and resident of Boston, in the county of Suffolk and State of Massachusetts, have invented certain new and useful Improvements in Electric Motors; and I do hereby declare the following to be a full, clear, and exact description of the same, reference being had to the accompanying drawings, forming part of this specification, and to the figures and letters of reference marked thereon.

This invention relates to electric motors and is particularly designed to provide a simple and cheap electric motor adapted for operating advertising devices at a substantially constant speed and for being run by practically any current which may be available; that is to say, current derived from batteries, from power circuits, or from lighting circuits, and either alternating or direct.

The invention consists in certain novel details of construction and combinations and arrangements of parts all as will be hereinafter described and pointed out particularly in the appended claims.

Referring to the accompanying drawings,—Figure 1 is a plan view of a motor embodying the present improvements shown in connection with a portion of an advertising device and with the cover of the motor case removed. Fig. 2 is an elevation with the motor case in section and part of the gearing removed. Fig. 3 is a detail section longitudinally of one end of the armature shaft and its bearing and with the worm gear wheel in elevation. Fig. 4 is a perspective view of one field magnet. Fig. 5 is a similar view of the armature and commutator.

Like letters of reference in the several figures indicate the same parts.

The motor of the present invention embodies two field magnets each having two pole pieces and the pole pieces of opposite sign of the two field magnets located in proximity to each other adjacent the same end of the armature. The armature which is of simple design embodies straight helices surrounding magnetic cores and having segmental pole pieces, there being preferably three separate cores, each having a pole piece at its two ends and the pole pieces of the three cores constitute substantially a complete circle or disk. The connection between the pole pieces is formed of non-magnetic material, to which the shaft and commutator are attached.

Referring to the drawings, A A' indicate two field coils, preferably simple bobbins of wire of suitable gage surrounding magnetic cores to which the pole pieces may be attached by screws in the ordinary way. The pole pieces of each field coil are of corresponding form and each embodies an end B adapted to lie in proximity to the end face of the armature poles, and a semi-cylindrical off-set B' adapted to partially encircle the periphery of the armature poles. The pole pieces of the two field magnets are so positioned that the north pole of one field and the south pole of the other field are at the same end of the armature, and the four pole pieces overlie opposite end faces of the armature while their off-sets B' extend partially around the armature on diametrically opposite sides, thereby forming an open chamber in which the armature may revolve. The pole pieces are rigidly connected together at top and bottom by non-magnetic connections; thus, at one end they are rigidly secured to the plate C and at the other to a plate C', the said plate C' and plate C being adapted to support or are rigidly connected with adjustable bearings in which the ends of the armature shaft are supported as will be presently described. The armature itself is formed of three coils F, each preferably a simple straight coil surrounding a magnetic core. Each magnetic core has at each end an arc shaped pole piece *f*. Said pole pieces are joined together at the center by a hub G of non-magnetic material, such for instance, as brass, to which the inner corners of the pole pieces may be brazed, whereby the three coils and their cores are all connected in a solid structure.

As a convenient way of forming the pole pieces for the armature, disks of magnetic metal are bored centrally for the reception of the hub or non-magnetic center and the latter is brazed in place, after which the disks are sub-divided by radial cuts to form the several segmental pole pieces, as will be readily understood from an inspection of the drawing. Each pole piece may be connected with its core by a screw in the ordinary way, and the non-magnetic center is utilized as the base to which the armature shaft is attached. At one end, the armature shaft H is provided with a three segment commutator $h$, and at the other end the armature shaft is prolonged and formed or provided with a screw gear $h^2$ through which the movement of the armature is imparted to a train of gearing including a worm gear wheel $i$, pinion $i'$, gear wheel $i^2$ and a crank arm I for operating the advertising mechanism.

The armature construction described, permits of the coils being brought close together at the center, and the shaft may be omitted between the heads forming the pole pieces of the armature.

The plate C before referred to supports the bearing for one end of the armature, and also constitutes the support for the commutator brushes. Said brushes are conveniently in the form of the usual carbon rods shown at K mounted to slide in guides K' carried by the plate and insulated therefrom by bushings $k$. The brushes are of course advanced by springs held within the outer ends of the guides and retained by screw caps $k'$. As a convenient means for supporting the terminal binding posts of the motor, a block L of insulating material is secured rigidly to one of the pole pieces, and spring arms $l'$ firmly fastened in said block are adapted to engage with terminal connector arms $l^2$ projected in through the casing or through an insulating plate $l^3$ on the casing.

In the preferred arrangement of the circuits, the coils of the field magnets are in series and in series with the armature. The armature coils are, in accordance with well known practice, each connected at one end with one segment of the commutator, and all of the opposite ends of the armature coils are connected together. With this arrangement the wire from one of the field coils leads to one of the brushes of the commutator and the other brush of the commutator is connected with one of the binding posts for one of the leading in wires. Owing to the arrangement of the pole pieces, the armature has an exceedingly uniform torque and more than an ordinary amount of starting torque. It will run on practically any available current and the construction is exceedingly simple and cheap. Each of the separate parts is of simple design requiring little or no machine work in their formation and finish; thus, the motor is especially well adapted for the use for which it has been designed.

The whole motor mechanism is preferably inclosed in a tight metal casing M having a removable cover M' and as a convenient way of mounting it in position the end plate C' is formed with a web and foot $C^2$ adapted to be fastened by screws to the bottom of the casing. The web has the bearing for the worm wheel and pinion therein and also has an extension $C^3$ for supporting the armature shaft bearing. The bearings for opposite ends of the shaft are substantially duplicates, thus each is in the form of a sleeve D adapted to receive the reduced end of the shaft and held in place by a set screw O, whereby it may be adjusted longitudinally.

The sleeve bearings seat in transverse openings in the upper ends of oil wells P preferably rigid, or cast integral with the plates C, C', and to supply lubricant each sleeve is cut away or slotted at an intermediate point as at $d$, and a wick Q extends into the slot and down into the oil well. For lubricating the worm gear wheel the said wheel may extend down into a well R in the bottom of the casing and adapted to retain a suitable quantity of oil.

Having thus described my invention, what I claim as new and desire to secure by Letters Patent of the United States, is:

1. In a motor, the combination with two separate field magnets having independent pole pieces, with the pole pieces of opposite sign of the respective magnets in proximity to each other at opposite ends of the armature, of an armature having pole pieces at its opposite ends located between the pole pieces of the field magnets, and armature coils and cores extending between and connecting said armature pole pieces, substantially as described.

2. In an electric motor, the combination with the two separate field magnets having their pole pieces of opposite sign in proximity to each other at opposite ends of the armature, of an armature having disk like ends subdivided into segmental sections, each forming an armature pole piece, and magnetic cores connecting pole pieces at opposite ends of the armature, substantially as described.

3. In an electric motor, the combination with the independent field magnets each having two pole pieces with semi-cylindrical off-set portions, the pole pieces of opposite sign of the respective field magnets being located at the same end of the armature, of an armature having disk-like ends divided into segments forming armature pole pieces, corresponding segments at opposite ends of the armature being connected by magnetic cores and the pole pieces being located longitudinally between the field magnet pole pieces and radially within the off-set portions on the field magnet pole pieces.

4. In an electric motor, the combination with the two field magnets, each embodying a straight magnetic core and coil surrounding the same with pole pieces on each end of said core, each of said pole pieces embodying a flat end face and semi-cylindrical off-set, the ends of the two pole pieces being arranged in proximity to each other with the poles of opposite sign at the same end of the armature, of the armature mounted within the off-set portions and intermediate the four pole pieces of the field magnets, said armature embodying a plurality of straight magnetic cores, each having at each end a segmental pole piece forming a segment of a disk, non-magnetic connections between said segmental pole pieces, and shaft extensions mounted in said non-magnetic connections.

5. In an electric motor, the combination with the two field magnets, having oppositely disposed pole pieces, with pole pieces of opposite sign at the same end of the armature, of an armature embodying segmental pole pieces each forming a portion of a disk-like armature end, the oppositely disposed armature pole pieces being located within the field magnet pole pieces of the magnets, shaft extensions on the armature extending through between the field magnet pole pieces, journal bearings for said shaft extensions located at opposite ends of the field magnets respectively, a commutator on one end of the shaft and a driving gear on the opposite end of the shaft.

6. In an electric motor, the combination with the two independent field magnets, each embodying a straight magnetic core and coil with oppositely disposed pole pieces extending to one side of said core and coil, and terminating in a flat face with a semi-cylindrical off-set projecting therefrom, the said field magnets being rigidly connected together with their pole pieces oppositely arranged and the pole pieces of opposite sign in proximity to each other, of an armature embodying end disks sub-divided to form segmental pole pieces, straight magnetic cores and coils connecting the segmental pole pieces at opposite ends of the armature, a commutator mounted on the armature and extending through the field magnet pole pieces at one end of the armature, a plate connecting the field magnet pole pieces, and commutator brushes carried by said plate, substantially as described.

7. In an electric motor, the combination with two independent field magnets each having oppositely disposed pole pieces and with one pole piece of each magnet at each end of the armature, of an armature having disk-like ends sub-divided to form armature pole pieces with magnetic cores and coils connecting said armature pole pieces, and circuit connections whereby the field magnet coils are in series with each other and with the armature, the pole pieces of the two field magnets at the same end of the armature being of opposite sign.

8. In an electric motor for operating advertising devices, the combination with a frame, two separate field magnets, rigidly mounted on said frame, and each embodying a magnetic core and coil with circuit connection whereby poles of opposite sign are at the same end of the armature, of an armature journaled in the frame and having end extensions passing through between said pole pieces, a commutator mounted on one armature extension and a driving gear mounted on the other armature extension, the bearings in which said armature is mounted being located on the outer sides of the commutator and gearing respectively.

9. In an electric motor, an armature formed with disk-like ends sub-divided into segmental pole pieces connected by non-magnetic metal, magnetic cores and coils connecting the segmental pole pieces at opposite ends of the armature, and armature supporting shaft projections carried by the non-magnetic connecting metal between the pole pieces.

JOHN BUCKLEY.

Witnesses:
 FRED B. WHEELER,
 JAMES F. PENNELL.

Copies of this patent may be obtained for five cents each, by addressing the "Commissioner of Patents, Washington, D. C."